United States Patent [19]

Schreiber

[11] 3,994,632

[45] Nov. 30, 1976

[54] ROTARY ENGINE AND PUMP

[76] Inventor: Ralph E. Schreiber, 2203 Grove Lane, Cary, Ill. 60613

[22] Filed: Jan. 8, 1975

[21] Appl. No.: 539,485

[52] U.S. Cl. .............................. 417/534; 123/45 A; 74/22; 92/33

[51] Int. Cl.$^2$ .................... F04B 39/00; F16H 25/16; F02B 53/00

[58] Field of Search ................ 92/33, 31; 74/22, 56, 74/57; 123/45 A, 58 C; 417/500, 492, 534

[56] References Cited

UNITED STATES PATENTS

| | | | |
|---|---|---|---|
| 226,591 | 4/1880 | Barrie | 123/58 C |
| 1,238,939 | 9/1917 | Pfleeger | 417/500 |
| 1,613,136 | 1/1927 | Schieffelin | 123/45 A |
| 1,736,822 | 11/1929 | Dreisbach | 124/45 A |
| 1,746,544 | 2/1930 | Malm | 74/22 |
| 2,368,013 | 1/1945 | Ford | 417/261 |

FOREIGN PATENTS OR APPLICATIONS

| | | | |
|---|---|---|---|
| 1,030,563 | 5/1966 | United Kingdom | 92/33 |

*Primary Examiner*—William L. Freeh
*Attorney, Agent, or Firm*—Wheeler, Morsell, House & Fuller

[57] ABSTRACT

Disclosed herein is an engine having opposed cylinders with a guided rotary and reciprocating piston which telescopes over an output shaft and transmits rotary motion directly to the output shaft without the need for a crankshaft. Guided rotary movement of the piston is afforded by rollers rotatably supported on a radial pin on the cylindrical wall of the piston. The rollers travel in an elliptical type groove on the inside surface of the cylinder to impart rotary motion to the piston as a result of rectilinear motion of the piston caused by combustion of fuel in the working chambers on opposite sides of the piston. The engine can also be operated by an external source of pressurized gas or operated as a pump. The rotary motion is transmitted to the output shaft by a rider block which has a square cross section and which is fixed to the output shaft and is complementary in shape to a square opening in the piston. The rider block is movable between end walls in the piston. Circular openings with cylindrical seals seal the output shaft to the piston.

4 Claims, 3 Drawing Figures

ROTARY ENGINE AND PUMP

BACKGROUND OF INVENTION

The invention relates to an improved internal combustion engine employing a free piston which reciprocates between oppositely located working chambers on an output shaft. Prior art engines of this type such as that shown in the Moore U.S. Pat. No. 1,389,453 have a piston with a square bore which interfits with a square portion of the output shaft to transmit rotary motion of piston to the output shaft. With designs of this type difficulty is encountered in sealing the square output shaft in the square piston bore and in providing a workable arrangement of rollers which ride the groove surface. The groove curvature of the prior art is generally limited to sinusoidal configurations.

SUMMARY OF INVENTION

The invention provides an opposed working chamber engine in which sealing difficulties of the Moore piston are overcome by an arrangement which employs a rider block square in cross section fixed on the cylindrical output shaft which interfits in a square bore on the piston. The rider block has a length less than the piston and the cylindrical portions of the output shaft adjacent the rider block extend through cylindrical apertures in the piston end walls to thus afford the use of conventional annular seals between the output shaft and the piston.

The rectilinear motion of the piston is converted to rotary motion by two rollers or bearings rotating on the same axis on a pin located on the piston surface. The rollers are guided in an elliptical or oval type track on the inner offset cylinder wall. The track is in a plane which is transverse to both the longitudinal and radial axes of the cylinder and thus, the groove or track provides a camming action in cooperation with the piston rollers to cause rotary movement of the piston as the piston reciprocates in response to firing impulses in the oppositely located working chambers of the cylinder. Smooth guided movement of the piston with respect to the annular cam track is afforded by the use of two rollers of different diameters supported for rotation on one axis. The large diameter roller engages an outer channel wall and the small diameter roller engages an inwardly offset shoulder on the opposite channel wall. The dual rollers on a common axis provide constant engagement of each roller with an opposed wall surface to minimize play which would occur if only one roller is employed as found in prior art patents.

Further objects, advantages and features of the invention will become apparent from the following disclosure.

DESCRIPTION OF PREFERRED EMBODIMENT

Figure 1:
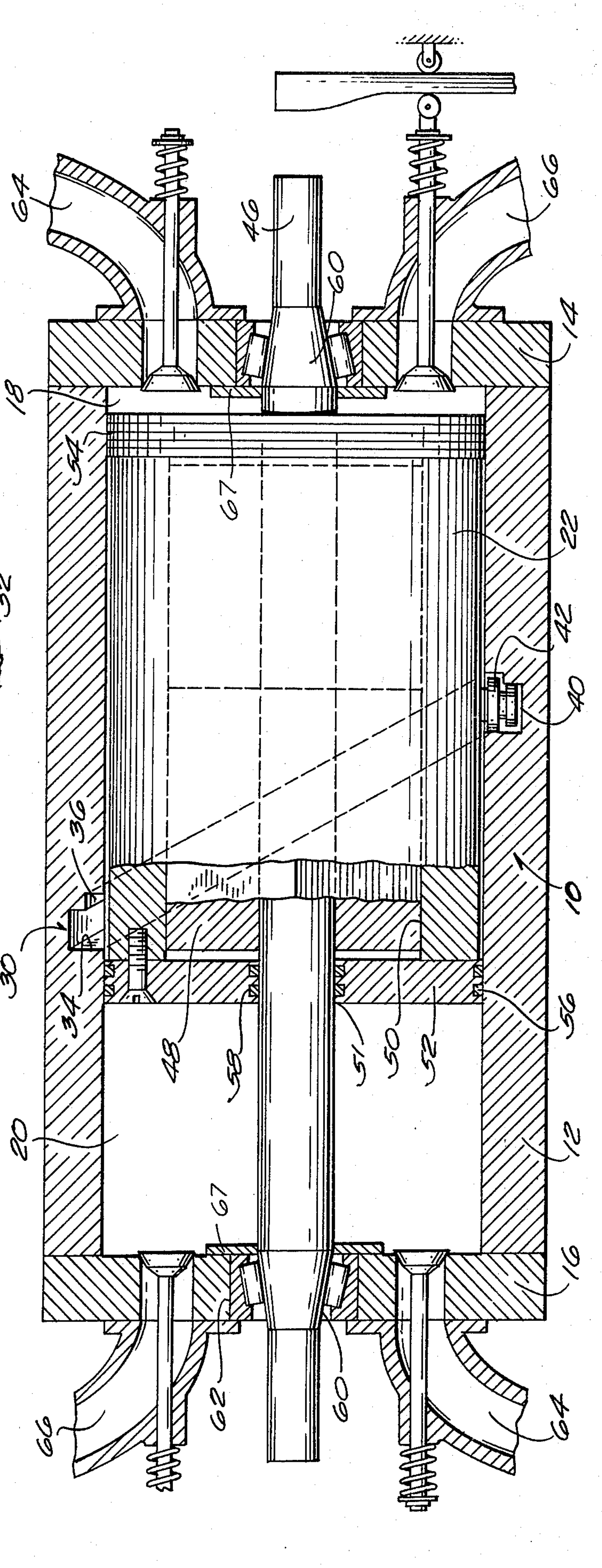
FIG. 1 is a sectional view of the engine in accordance with the invention.
Figure 3:
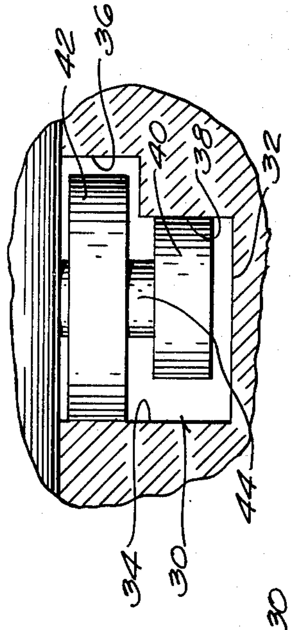
FIG. 3 is an enlarged fragmentary sectional view of the cam track and roller arrangement shown.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

A rotary engine 10 includes a cylinder 12 having opposed cylinder heads 14, 16 and opposed working chamber 18, 20 located on opposite sides of a piston 22.

Rectilinear movement of the piston 22 can be caused by combustion of fuel in the working chambers caused by spark plugs, compressed fuel injection or other ignition devices (not shown). Alternatively, compressed gases can be employed to cause movement of the piston. The shaft can be powered by an external source (i.e. electric motor) and thus convert the design to a pump.

In accordance with the invention, means are provided for imparting rotary motion to the piston upon rectilinear movement thereof. In the disclosed construction the means comprises a cam groove or track 30 having a groove bottom 32, opposed groove walls 34, 36 and a shoulder having a surface 38 which is inwardly offset from surface 36. The cam groove 30 is generally oval or elliptical in configuration and is in a plane which is non-normal to the axis of linear movement of the piston 22. The means also includes two bearings or rollers 40, 42 mounted on a pin 44 for rotation on the same axis which is radial or normal with respect to the axis of longitudinal movement of the piston. The roller 40 engages a surface 38 and the larger diameter roller 42 engages the surface 34, thus providing continuous engagement of the rollers with the cam groove or track during the complete circuit of the rollers in the cam track. The use of a single roller is not feasible because a certain amount of clearance is required in order to prevent binding of the roller in the groove. Such clearance also can cause vibration during use of the engine which will minimize the life of the parts. The use of two rollers as shown eliminates play and thus vibration.

Figure 2:
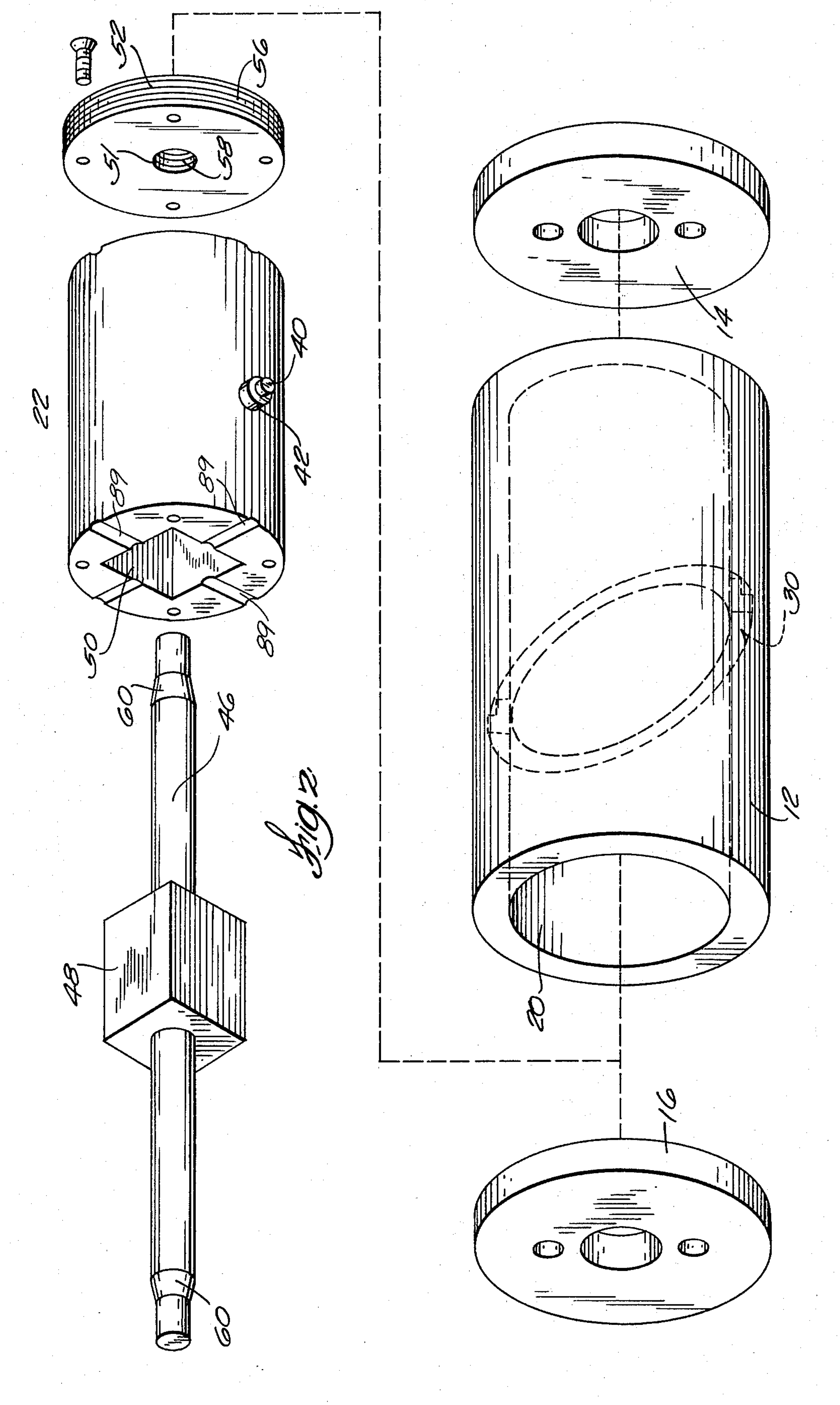
FIG. 2 is an exploded view of the cylinder and piston and output shaft assembly of the engine shown in FIG. 1.

In accordance with the invention, means are provided for transmitting the rotary motion of the piston 22 to the output shaft 46. In the disclosed construction the output shaft 46 is provided with a rider block 48 which is fixed thereto and of a length less than that of the piston. The rider block 48, as shown, (FIG.2) is square in cross section and interfits in a square bore 50 in the piston. Other complementary rider block cross sections and bore configurations can be utilized if they provide a rotary driving engagement between the piston and the output shaft 46. The rider block 48 is sealed in the bore 50 by piston end walls 52, 54 which have cylindrical apertures 51 with compression and oil sealing rings 58 which seal the bore 50 to the ouput shaft 46 for both sliding and rotary movement. In addition, the end walls 52, 54 can be provided with the compression and oil rings 56 to seal the piston to the wall of the cylinder. Piston 22 is of a somewhat smaller diameter than piston end walls 52, 54 to allow air and oil movement. Only rings 56 have contact with cylinder 12, however.

The output shaft 46 can be provided with a tapered surface 60 adjacent each end thereof with bearings 62 in the cylinder heads in engagement with the surfaces 60 to positively locate the shaft 46 with respect to the cylinder 12. A compression plate 67 or ring seals, would be fitted to the shaft to seal the bearing area in addition to use of conventional oil bearing seals.

Intake and exhaust valve assemblies 64, 66 for each working chamber are shown but not described in detail because they form no part of the present invention. Any suitable valving and valve control can be employed for operation in a two or four cycle mode.

Although rotary internal combustion engines having opposed combustion chambers or cylinders are known, engines of this type have not been successful because of sealing difficulties and problems in controlling the guided rotary piston movement. The present invention overcomes difficulties of prior art engines of this type by employing conventional cylindrical piston rings and conventional cylindrical seals to seal the working chambers around the piston and by employing two bearings operated through a single axis on offset walls in the cylinder grooves.

Conventional head and cylinder cooling can be employed. Oil circulation is basically conventional with alternative routing and drainage approaches available. Oil can enter the bearings 62 and flow into a hollow shaft 46 and out on each rider block surface 48, and out duct exits 89 in the piston to the cylinder wall and groove surface, for lubricating the dual bearings 40, 42 and into a small pump (not shown) through groove surface 32. Centrifugal motion and the relative motion between the rider block and piston provide pumping action for movement of oil through passage 89.

Several of the engines of this design can be serially connected with the output shafts co-axially connected. This design also affords the use of various dimensions for piston diameter, stroke and groove path, which flexibility is not found in other rotary engine designs.

I claim:

1. In an engine, a pair of spaced working chambers defined by a cylindrical wall having an inner surface, a piston movable linearly in said working chamber in response to gas pressure in said chambers and in gas sealed relation with said cylindrical wall, said piston having end walls with cylindrical apertures, an output shaft having cylindrical shaft portions extending through said apertures, and guide means on said piston and cylindrical wall to cause guided rotary movement of said piston upon axial movement of said piston, and means on said output shaft between said piston end walls for drivingly and slidingly connecting said output shaft to said piston to impart rotary motion to said shaft upon rotation of said piston and wherein said guide means comprises an oval groove recessed in said inner surface of said cylinder and inwardly open towards said piston, said groove being in an transverse plane with respect to the axis of travel of said piston and said groove limiting travel of said piston between two opposed piston positions and two guide rollers located in said groove and supported for free rotation on said piston about an axis radial with respect to said piston, said rollers having different diameters and said groove being defined by a groove bottom wall and first, second and third grove side walls, said first and second side walls being opposite said third side wall and wherein said first side wall joins said bottom wall and is spaced from said third wall a distance less than the distance of said second wall from said third wall, to form a stepped shoulder within said groove and wherein said smaller diameter roller rollably engages said first side wall and said larger diameter roller rollably engages said third wall.

2. The improvement of claim 1 including seals in said apertures in said piston end walls to prevent transmission of gas from one working chamber to another and afford relative movement of said piston with respect to said output shaft.

3. The improvement of claim 1 wherein said means on said piston and said cylinder wall to afford rotary movement of said output shaft upon axial movement of said piston comprises an opening in said piston and a body portion on said output shaft interfitting in said piston opening said body portion having a shape complementary to said piston opening to afford guided axial movement of said piston relative to said output shaft and cause movement of said output shaft upon rotary movement of said piston.

4. In an engine having a piston operatively associated with a pair of spaced working chambers defined by a continuous cylindrical wall and movable axially and rotatably in said cylinder the improvement for guiding said axial and rotatable piston movement comprising large and small diameter rollers rotatably supported on said piston for rotation about a common generally radial axis and an oval track in said cylindrical wall having two opposed surfaces and an outwardly offset surface with said rollers engaged with said opposed surfaces and said offset surface affording clearance with said larger diameter roller and wherein the combined radial distance of said rollers is substantially equal to the maximum spacing between said surfaces.

* * * * *